United States Patent [19]

Brown

[11] Patent Number: 5,530,549
[45] Date of Patent: Jun. 25, 1996

[54] PROBING RETROREFLECTOR AND METHODS OF MEASURING SURFACES THEREWITH

[75] Inventor: Lawrence B. Brown, Cochranville, Pa.

[73] Assignee: Spatialmetrix Corp., Kenneth Square, Pa.

[21] Appl. No.: 248,150

[22] Filed: May 24, 1994

[51] Int. Cl.⁶ ................................................. G01B 11/00
[52] U.S. Cl. ............................................................. 356/376
[58] Field of Search ...................................... 356/375, 376

[56] References Cited

U.S. PATENT DOCUMENTS

| | | | |
|---|---|---|---|
| 2,589,618 | 3/1952 | Learned | 359/529 |
| 4,457,625 | 7/1984 | Greenleaf et al. | 356/360 |
| 4,483,618 | 11/1984 | Hamar | 356/400 |
| 4,621,926 | 11/1986 | Merry et al. | 356/363 |
| 4,714,339 | 12/1987 | Lau et al. | 356/4.5 |
| 4,790,651 | 12/1988 | Brown et al. | 356/4.5 |
| 4,886,353 | 12/1989 | Fondeur | 356/4.5 |
| 4,926,559 | 5/1990 | Knabel | 33/832 |
| 4,942,671 | 7/1990 | Enderle et al. | 33/559 |
| 4,972,597 | 11/1990 | Kadosaki et al. | 33/558 |
| 5,174,039 | 12/1992 | Murai | 33/556 |

Primary Examiner—Richard A. Rosenberger
Attorney, Agent, or Firm—Roylance, Abrams, Berdo & Goodman

[57] ABSTRACT

A probing retroreflector for determining the location and dimensions of a target in conjunction with optical measuring systems, such as tracking laser interferometers. The probing retroreflector comprises a support, a retroreflector assembly coupled to the support and having a center point, a planar reflector coupled to the support for reflecting light towards and receiving light from the retroreflector assembly, and a sensor such as a slender probe coupled to an end of the support. The center point of the retroreflector assembly is located at a position which represents the virtual location of the center point of the sensor, so that the location of the point on the surface to be measured, which is sensed by the sensor, can be accurately determined by the optical measuring system.

24 Claims, 4 Drawing Sheets

PROBING RETROREFLECTOR AND METHODS OF MEASURING SURFACES THEREWITH

FIELD OF THE INVENTION

The invention relates to a probing retroreflector for use in conjunction with optical measuring systems for accurately determining the location in space and shape of small or complex targets, such as contoured surfaces. The probing retroreflector is typically used with a tracking laser interferometer and both locates and follows the contour of the surface and serves as the optical target and reflector for the tracking laser interferometer. By providing a virtual location representation of the sensing end of the probing retroreflector, the device can be used to precisely locate and follow the contour of very small or complex surfaces.

BACKGROUND OF THE INVENTION

Optical measuring systems are known for determining the location and contour of complicated surfaces which have been machined, molded or otherwise fabricated. These devices typically use lasers and laser interferometers to determine the contour of the surface to be measured by taking a series of very accurate location measurements at a series of points on the surface in a controlled volume and converting the three-dimensional points into a representation of the contour being measured. Knowing three distances from a fixed reference location, the three-dimensional coordinates of the surface can be determined. Alternatively, determining one distance and two angles in the measuring system, the required three-dimensional coordinates can be obtained. In addition to measuring three-dimensional coordinates, these systems can also be used to measure merely two-dimensional coordinates such as the location of a target known to lie in a plane. Similarly, these systems can also be used to measure one-dimensional coordinates such as the distance or angular orientation of a target relative to a reference position.

In order to locate and trace the contour of the targeted surface to be measured, typically a retroreflector is utilized. This retroreflector is typically a corner cube or cat's eye retrosphere which is moved along the contour to be measured by hand or by robot machine and which constantly receives and reflects the laser beam from the optical measuring machine to provide a series of location readings for the contour of the surface being measured. Examples of these types of optical measuring systems are disclosed in the following U.S. patents, the disclosures of which are hereby incorporated herein by reference: U.S. Pat. No. 4,457,625 to Greenleaf et al; U.S. Pat. No. 4,621,926 to Merry et al; U.S. Pat. No. 4,714,339 to Lau et al; and U.S. Pat. No. 4,790,651 to Brown et al.

The target often used with a tracking laser interferometer is a spherically mounted retroreflector, which consists of a retroreflector whose center point is accurately placed inside a spherical ball. The ball is carried around the working volume and placed into contact with the surface to be measured as data therefrom is collected. The three-dimensional measurements made with such a tracker are actually made to the center point of the retroreflector, which will be offset by one ball radius from the surface the spherically mounted retroreflector is touching. The advantage of such a retroreflector is its ability to work with a variety of surface shapes at a constant offset.

However, there is a significant disadvantage to this type of retroreflector. The disadvantage is its size which is dictated by the size of the optical aperture needed which is from about ⅜" to 1" or larger. Thus, very small retroreflectors on the order of 1/32" or ⅛" cannot be used, and therefore, it is very difficult for such types of trackers to accurately measure small details in a surface such as grooves, holes, recesses, sharp inside radii, etc.

Examples of additional prior art devices relating to probes and measuring systems include the following U.S. patents: U.S. Pat. No. 2,589,618 to Learned; U.S. Pat. No. 4,926,559 to Knabel; U.S. Pat. No. 4,942,671 to Enderle et al; U.S. Pat. No. 4,972,597 to Kadosaki et al; and U.S. Pat No. 5,174,039 to Murai.

Thus, there is a continuing need to provide improved retroreflectors and retroprobes for use with dimensional measuring machines of versatility and high accuracy.

SUMMARY

Accordingly, a primary object of the invention is to provide a probing retroreflector that can be used in measuring target locations and contours of small size or complex configuration, including grooves, holes, recesses and sharp inside radii.

Another object of the invention is to provide a probing retroreflector that can be used, for example, with a tracking laser interferometer and can be hand-held or manipulated by a robot machine.

Another object of the invention is to provide a probing retroreflector that is relatively simple and inexpensive to manufacture and use and that can be used in determining at least one of the x, y and z spatial coordinates of a target relative to a reference position, as well as the polar coordinates thereof.

A further object of the invention is to provide a probing retroreflector and a method of measuring a target in which the probing retroreflector provides a virtual location of the point or points on the target to be measured which is sensed by the probing retroreflector.

The foregoing objects are basically attained by providing a method of measuring the dimensions of a surface comprising the steps of: directing a light beam generally towards the surface from a source located at a reference position, reflecting the light beam away from the surface and towards a point in space which represents the virtual location of a point on the surface, retroreflecting the light beam in the opposite direction and in a substantial parallel manner, reflecting the light beam generally away from the surface and generally towards the reference position, and periodically moving the point in space relative to the surface and determining the location of the point in space from the reference position using the reflected light beam.

The foregoing objects are also basically attained by providing a retroreflector, the combination comprising: a support; a retroreflector assembly for receiving a light beam and reflecting the beam in the form of an output beam parallel to the input beam, the retroreflector assembly having a central axis B and a center point C; a planar reflector for reflecting a light beam from a source onto the retroreflector assembly and for reflecting a light beam from the retroreflector assembly towards the source; a sensor for sensing the location of a target; and a mechanism, coupled to the support, retroreflector assembly, planar reflector and sensor, for locating the center point C of the retroreflector assembly at a position which represents the virtual location of the sensor with respect to the light beam.

Other objects, advantages and salient features of the invention will become apparent from the following detailed description, which, taken in conjunction with the annexed drawings, discloses preferred embodiments of the invention.

DRAWINGS

Referring now to the drawings which form a part of this original disclosure.

DETAILED DESCRIPTION OF THE INVENTION

Figure 1:
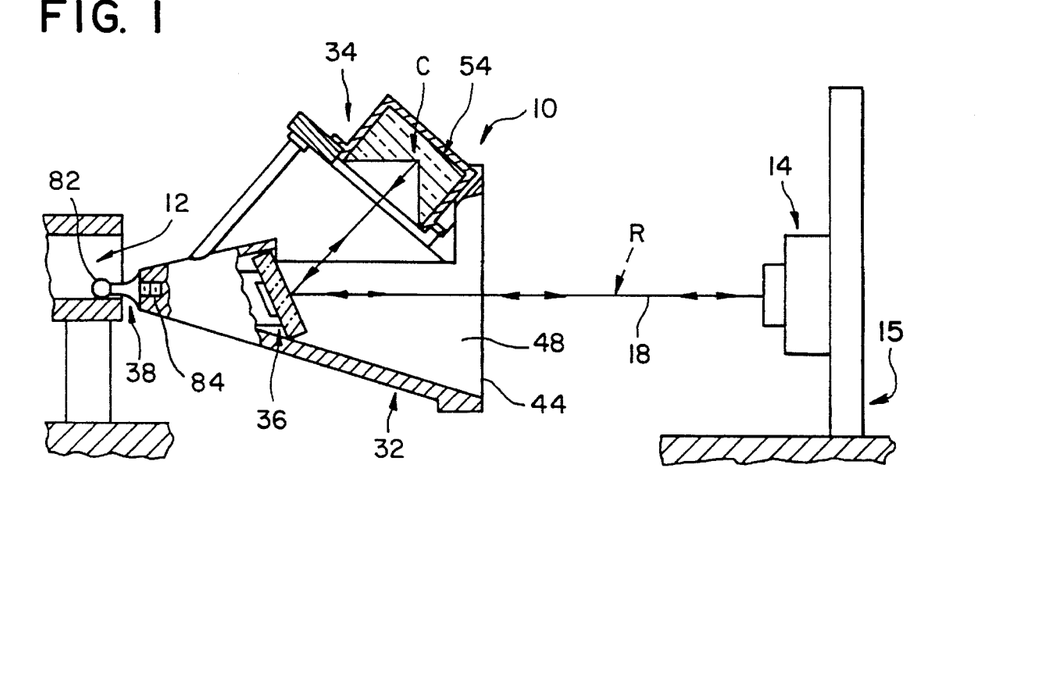
FIG. 1 is a side elevational diagrammatic view, not to scale, of the probing retroreflector in accordance with the invention including a tracking laser interferometer at a fixed reference location and a target for use with the probing retroreflector.
Figure 2:
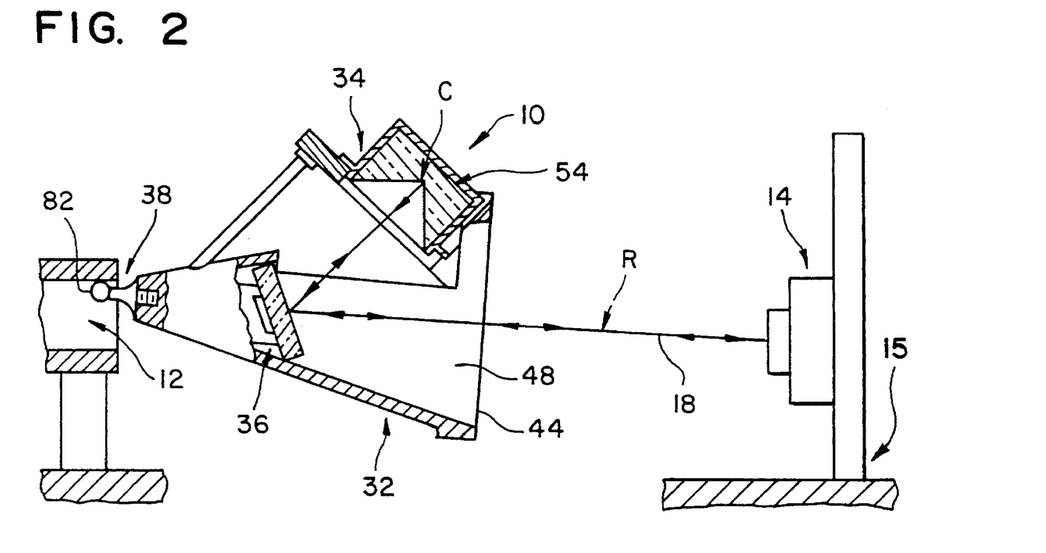
FIG. 2 is a side elevational diagrammatic view, not to scale, of the probing retroreflector, target and tracking laser interferometer shown in FIG. 1, but with the probing retroreflector displaced to another position relative to the target and tracking laser interferometer.
Figure 5:
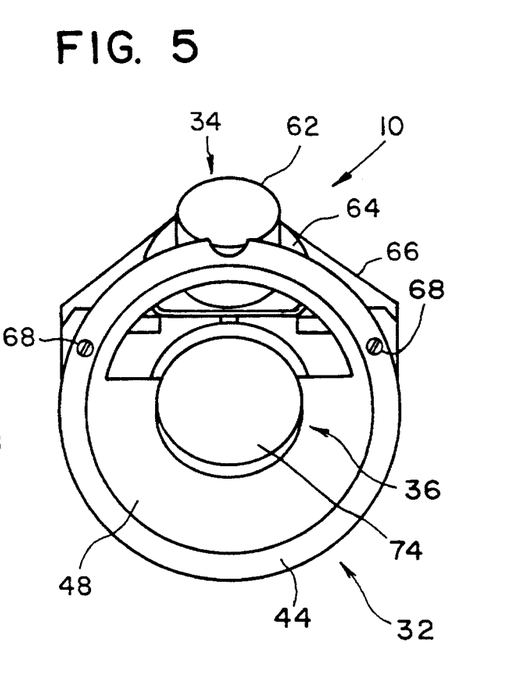
FIG. 5 is a rear elevational view of the probing retroreflector shown in FIG. 3.
Figure 6:
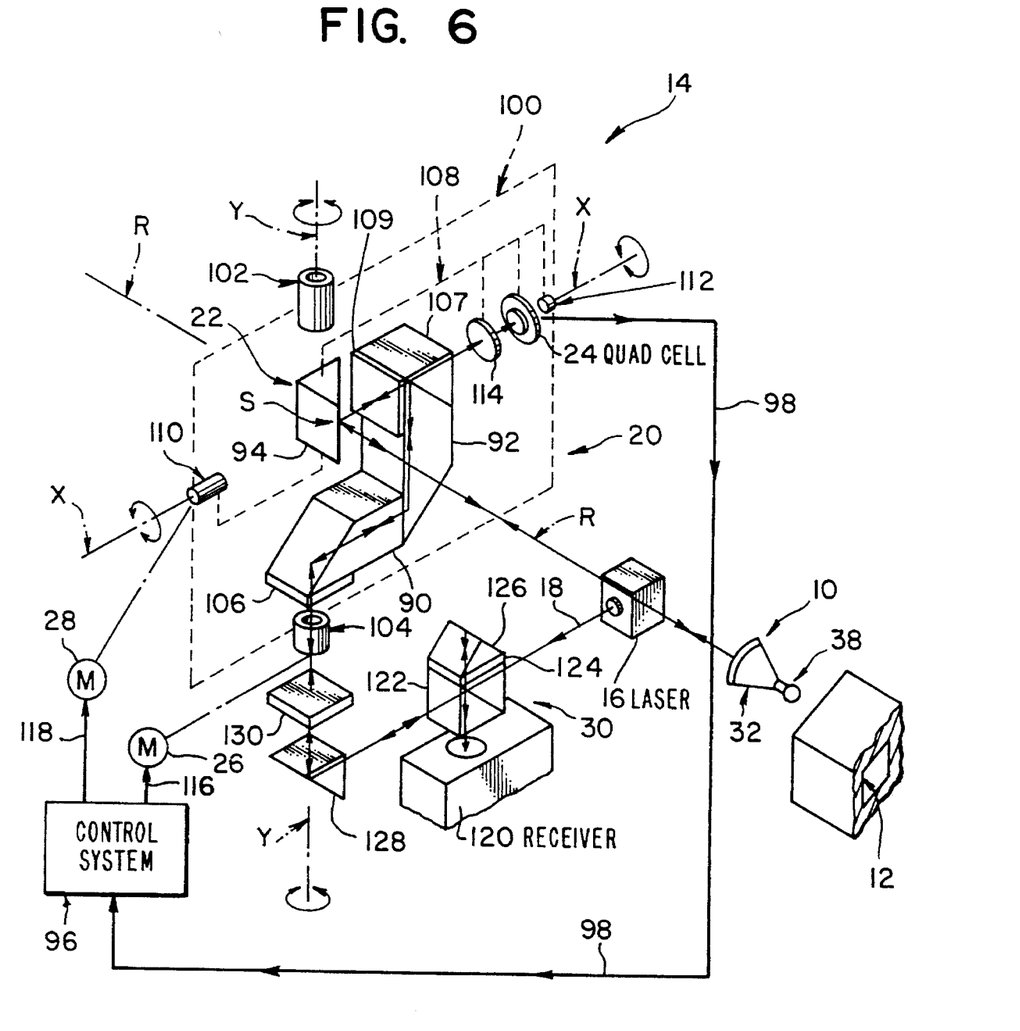
FIG. 6 is an optical schematic, not to scale, of the probing retroreflector in accordance with the invention in connection with an exemplary tracking laser interferometer and target.

Referring now to FIGS. 1–6, the probing retroreflector 10 in accordance with the invention is intended to locate and follow the contour of a target surface such as surface 12 having a rectangular cross section, and to determine its three-dimensional x, y and z spatial coordinates and thus contour from a reference location using, for example, a tracking laser interferometer 14 rigidly positioned at the reference location 15 as seen in FIGS. 1 and 2. As seen in FIG. 6, the tracking laser interferometer 14 basically comprises a laser 16 capable of generating a laser beam 18 and first and second beam steering assemblies 20 and 22 used to track the probing retroreflector 10 as it is moved relative to the target surface 12.

As seen in FIG. 6, the steering assemblies 20 and 22 pivot, respectively, about substantially perpendicular and intersecting X and Y axes and direct the laser beam 18 along an R axis, which is perpendicular to the X axis and intersects the X and Y axes. Along the R axis, the laser beam is intercepted by the probing retroreflector 10, which, for example, engages the target surface 12 and which returns the laser beam to a position sensitive photodetector 24 via the steering assemblies. The photo detector generates an error signal based on a lateral displacement of the laser beam and representative of the probing retroreflector's movement relative to the X and Y axes, and this signal is transmitted to two motors 26 and 28 which pivot the steering assemblies about the X and Y axes to reduce the error to zero. The tracking laser interferometer 14 also includes an interferometer 30 which utilizes the laser beam 18 to determine the distance of the object from the reference location. The three-dimensional x, y and z spatial coordinates of the target surface can then be determined using that distance plus, for example, angle encoders coupled to the pivot axes X and Y for the first and second beam steering assemblies 20 and 22, i.e., using the three-dimensional polar coordinates generated thereby. Alternatively, three tracking laser interferometers can be used to continually provide three distance measurements from the fixed reference location or position 15 and thereby provide a three-dimensional coordinate for all points on the target surface via trilateration. Examples of two tracking laser interferometers are disclosed in U.S. Pat. No. 4,621,926 to Merry et al and U.S. Pat. No. 4,790,651 to Brown et al, the disclosures of which are hereby incorporated herein by reference.

Instead of an interferometer, the measuring means could use any other distance measuring technology such as laser radar or electronic distance measurement, all of which employ light and function by comparing the phase of the returning light with the outgoing light to determine range. The measuring means would optimally be a three-dimensional type, determining all three degrees of spatial freedom of the probing retroreflector, but there would be applications where only the range or angular orientation is used. Thus, the system can be used to determine at least one of the three spatial or polar coordinates of a target as desired. Optimally, the measuring means would track the retroreflector, but there could also be applications where a beam would scan an area to find the retroreflector and then measure it without actually tracking.

Referring now to FIGS. 1–5, the probing retroreflector 10 is shown comprising a rigid support 32, an internal retroreflector assembly 34 rigidly coupled to the support, a planar reflector assembly 36 rigidly coupled to the support inside the support, and a sensor or probe 38 at one end of the support.

Figure 3:
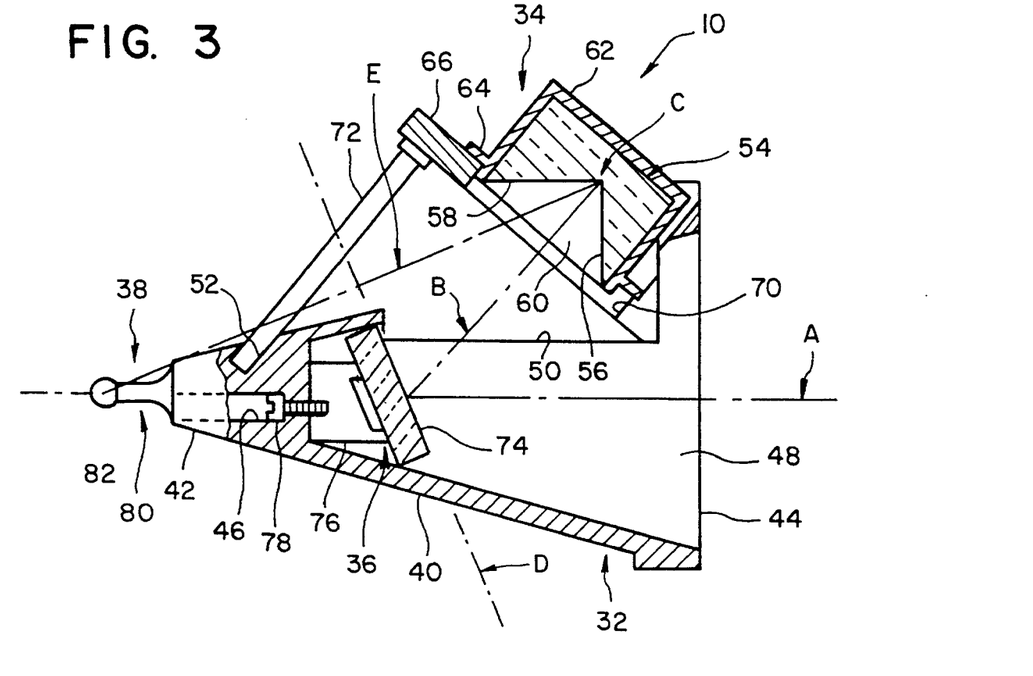
FIG. 3 is an enlarged side elevational view in partial longitudinal section showing the construction of the probing retroreflector as well as some of the relevant axes, planes, lines and center points thereon.
Figure 4:
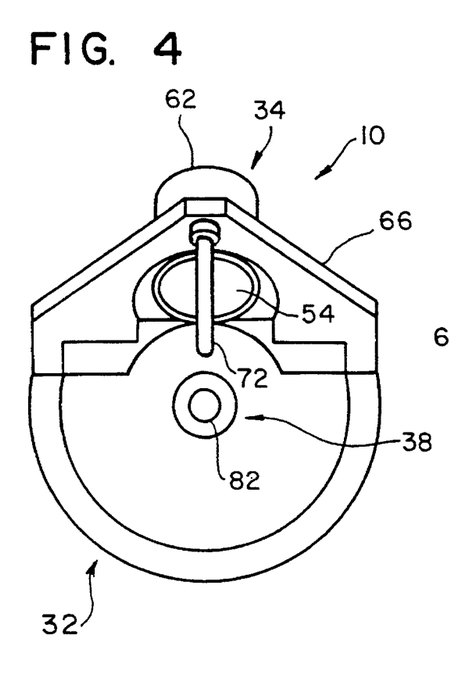
FIG. 4 is a front elevational view of the probing retroreflector shown in FIG. 3.

Support 32 has a substantially conical main body 40 and a central axis A as seen in FIG. 3. The outer conical shape is not a necessary feature of the invention, but is merely convenient. Any rigid structure that attaches to the retroreflector assembly, the planar reflector assembly and the sensor, and holds them in good dimensional stability while not interfering with the beam, i.e., provides an open conical volume for the beam, is acceptable. The main body preferably provides a suitable place for the user to hold it without interfering with the light beam. Preferably, the inside of the main body 10 is of a dark, non-reflective color such as black. The main body is formed of rigid material such as metal, and has a first end 42 and a second end 44. The first end 42 has a through bore 46 therein for mounting the planar reflector assembly 36 and the second end 44 is open for the transmission of the light beams into and out of the main body. The main body 40 has a hollow, substantially frustoconical cavity 48 therein communicating with the second open end 44 and a slot 50 at the top for light beam communication with the retroreflector assembly 34 as seen in FIG. 3. A blind bore 52 is also provided in the main body to help support the retroreflector assembly 34 thereon as discussed below.

The retroreflector assembly 34 basically comprises a corner cube 54 comprised of three planar, mutually orthogonal surfaces 56, 58 and 60 as seen in FIG. 3. The corner cube 54 has a central axis B which intersects with the planar reflector assembly 36 and axis A, and has a center point C.

The corner cube 54 is advantageously coupled to and supported by a cylindrical can 62 which has a rim 64 which is rigidly coupled, such as by screws, to a rigid planar support plate 66 which is in turn rigidly coupled via screws 68, seen in FIG. 5, to the main body 40 of the support 32. The support plate 66 has a central opening 70 through which the light beam can pass between the retroreflector assembly 34 and the planar reflector assembly 36 as seen in FIGS. 1–5. A rigid support rod 72 is supported in the blind bore 52 in the main body and rigidly coupled thereto via any suitable means, such as screws, adhesive or welds, and is also rigidly coupled to the support plate 66 via any suitable means, such as screws, adhesive, or welds. This rigidly couples the retroreflector assembly 34 to the main body in the desired position as shown in FIGS. 1–5 above slot 50.

Although a front surface corner cube is shown in FIG. 3, a solid glass corner cube using rear surface reflections could also be used. The advantages of front surface mirrors lie in the fact that the center point is fixed in space regardless of the angle from which the light strikes the cube, and the optical path length is constant regardless of the incidence angle. The retroreflector assembly could also be a cat's eye type retrosphere whose center point lies on the common center of two hemispheres, or any catadioptric system of lenses and mirrors made to function as a retroreflector and having a unique or predictable center point.

The planar reflector assembly 36 basically comprises a front surface reflector or mirror 74 having a support member 76 rigidly coupled thereto via, for example, adhesive, and rigidly coupled to the main body via, for example, a screw 78 received in bore 46 therein. As seen in FIG. 3, plane D contains the planar front surface of the reflector 74 and intersects at a common point with central axis A of the support and central axis B of the corner cube 54. Front surface reflector 74 is used to reflect the incoming laser beam 18 on the R axis from the laser 16 towards the corner cube, and receives the laser beam reflected back from the corner cube and returns and reflects the laser beam back towards the source of the laser beam at the laser 16 and reference position 15.

The front surface reflector 74 could also be a pentaprism, right angle prism, or any other reflector designed to fold, i.e., reflect, the beam path. The reflector can be arranged such that the light beam is reflected about 45° as shown. Advantageously, the angle of plane D containing the front surface reflector 74, as shown in the embodiment of FIGS. 1–5, is about 60° with the central axis B of the corner cube 54, although that angle could be any angle greater than zero and less than 180°.

The sensor 38 seen in FIGS. 1–4 is rigidly located at the first end 42 of the main body 40 and is used to sense the location of the target surface by, for example, contacting or touching the surface. The sensor 34 comprises an elongated, slender probe 80 having a substantially spherical distal end 82, with the distal end riding across and following the contour of the target surface. The diameter of the spherical end can be about 1/32" or 1/8", or larger or smaller as necessary. The probe 80 can be rigidly coupled to the main body via integral threaded member 84 threadedly received in a suitable threaded bore in the main body. It could also be secured by a slip fit and a set screw.

Although the probe is shown as a small spherical ball, it can be a sharp pointed member or a segment of a sphere. It could be any shape designed to be placed on contact with a surface to be measured and keep a predictable offset distance between the target surface and center point C. That center point C is the virtual, i.e., representational, location of the center point of the sensor as viewed through the planar reflector assembly 36 and with respect to the laser light beam. If the probe tip is a sharp point, then the predictable offset would be substantially zero.

In order to provide the virtual imaging relationship between the sensor and the corner cube center point C, the center of the sensor and the center point C are substantially equidistant from and on opposite sides of plane D containing the planar reflector assembly. Likewise, the center of the sensor and the retroreflector assembly center point C are on a line E which is substantially perpendicular to plane D as seen in FIG. 3.

In other words, as seen in FIG. 3, the distance between the intersection of central axis A and central axis B on the reflector assembly 36 with both the center point of the sensor 38 and the center point C of the corner cube are substantially equal.

The sensor 38 is normally rigidly attached to the retroreflector 10; however, there exist touch probes which send an electrical signal to another device when the probe tip is touched. This type of probe could also be used with the present invention, but would not be perfectly rigid since it would move slightly when touched. The probe tip could also be replaced with a contact or non-contact measurement probe such as a laser probe, dial indicator, electronic indicator, or LVDT.

Tracking Laser Interferometer

As shown in FIG. 6, the tracking laser interferometer 14 is illustrated in more detail and in conjunction with the probing retroreflector 10 in accordance with the invention and the target surface 12. The tracking laser interferometer 14 is fully disclosed in U.S. Pat. No. 4,790,651 to Brown et al; however, for completeness and ease of understanding, portions of the tracking laser interferometer as seen in FIG. 6 are described in further detail below.

As seen in FIG. 6, the tracking laser interferometer 14 basically comprises the laser 16 capable of generating a coherent laser beam 18, and first and second beam steering assemblies 20 and 22 which are capable of tracking the probing retroreflector 10 as it is moved along the target surface 12.

The first beam steering assembly 20 includes two prisms 90 and 92 which redirect the laser beam 18 through three 90° reflections from an initial direction parallel to the Y axis and towards the X axis to an intermediate direction along the X axis and towards the Y axis. The second beam steering assembly 22 includes a third prism 94 which redirects the laser beam through one 90° reflection from the intermediate direction along the X axis to one coincident with the R axis where it is intersected by the probing retroreflector 10 and returned to the prism 94 and then the photodetector 24.

In addition to the first and second beam steering assemblies, the tracking laser interferometer 14 includes first and second motors 26 and 28 to pivot respectively the first and second beam steering assemblies, the detection assembly comprising the photodetector 24, and a control system 96 for receiving an error signal from the photodetector and providing the necessary signals for actuating motors 26 and 28. An output line 98 extends between the photodetector 24 and the control system 96.

The first beam steering assembly 20 also includes a first support 100, an upper tubular shaft 102, and a lower tubular shaft 104, all of which pivot about the Y axis through about plus or minus 90°.

The first support 100 and prisms 90 and 92 can pivot about the Y axis in a scanning action relative to shafts 102 and 104, which are coaxial with each other and the Y axis. The first prism 90 has a quarter waveplate 106 on its bottom for use with a polarized laser beam. In addition, rigidly coupled to the top of prism 92 is an upper coated mirrored prism 107 which combines with prism 92 to form a beam splitter, allowing about 15% light leakage therethrough towards photodetector 24. Facing the third prism 94 and rigidly coupled to the second prism is a quarter waveplate 109.

The second beam steering assembly comprises a second, S-shaped support 108, a left side shaft 110, and a right side tubular shaft 112, as well as the third front surface prism 94, all of which pivot about the X axis and are supported by the first support 100.

The third prism 94 is located so that its 45° reflective surface is at the intersection of the X and Y axes which defines point S in space about which pivoting of the supports takes place. The alignment of these axes as defined by shafts 102 and 104 and shafts 110 and 112 is as accurate as the best machining tolerances will allow.

Shafts 110 and 112 pivotally couple support 108 and prism 94 to the first support 100 for pivotal scanning movement about the X axis.

The position sensitive photodetector 24 is rigidly supported inside the right side shaft 112 and is aligned with the X axis. Adjacent prism 92 and on the inner end of shaft 112 is a plano-convex lens 114 for focusing the laser beam on the photodetector 24. The photodetector comprises a detection assembly and is advantageously in the form of a quadrant detector, also known as a quad cell. Extending from the photodetector is the output line 98 which provides the error signal to the control system 96.

The control system 96 has a first output line 116 connected with the first motor 26 and a second output line 118 connected to the second motor 28. The control system is a conventional device that will take the error signal from the photodetector 24 and energize the first and second motors to rotate in the appropriate directions and for the appropriate amount of time in order to reduce the error signal to zero. This control system basically includes a digital computer with the necessary logic.

The interferometer 30 is an optical distance measuring machine and comprises a receiver, or fringe counter, 120, a beam splitter 122, a quarter waveplate 124, and a corner cube 126. These elements forming the interferometer are rigidly coupled in a position where the beam splitter 122 intercepts the laser beam 18 and splits it into first and second parts. The first part is directed towards the target. The receiver 120 intercepts the second part of the laser beam as reflected via the corner cube 126 from the beam steering assemblies. This provides a reference beam for the receiver, which ultimately intercepts the first part of the beam reflected from the retroreflector assembly 10 and determines a distance measurement of the target from the reference position.

In order to transmit the laser beam 18 from the beam splitter and in a direction parallel with the Y axis and towards the X axis, a beam guiding 45° rear surface prism 128 is rigidly located in alignment with the Y axis and below a quarter waveplate 130.

The retroreflector 10 receives the laser beam 18 as it is reflected from the prism 94 as seen in FIG. 6 along the R axis and in turn reflects the laser beam back to prism 94. This R axis is perpendicular to the X axis, intersects with the X and Y axes at point S, and varies angularly relative to the Y axis as the retroreflector moves along surface 12.

Operation

As indicated in FIGS. 1, 2 and 6, the main purpose of the probing retroreflector 10 is to locate and move along the contour of target surface 12, while the tracking laser interferometer 14 continuously determines three-dimensional coordinates for the series of points comprising the contact of the sensor 38 on the retroreflector with the target surface. By generating these coordinates, the system can determine the overall contour of the surface, or the location of any point on the surface.

Once the tracking laser interferometer 14 is actuated and acquires the probing retroreflector 10, which is in contact with the surface 12, the probing retroreflector is moved along the surface 12 by hand or machine.

Thus, in operation, first a laser light beam 18 is directed generally towards the target surface 12 from a source of the laser beam located at laser 16 at the fixed reference position 15 as seen in FIGS. 1 and 2. The laser beam is aimed at and is reflected generally away from the surface by planar reflector 74 and towards, in the form of an input beam, the center point C of the corner cube 54 in space, which point represents the virtual location of the center point of the spherical ball 82 at the distal end of the sensor 38 in contact with the target surface 12. The laser light is then incident on the corner cube 54 and is retroreflected, in the form of an output beam, by the corner cube in the opposite direction and in a substantially parallel manner as indicated in FIGS. 1 and 2. The light beam is then reflected generally away from the target surface and generally towards the source and reference position via planar reflector 74.

As these directing, reflecting and retroreflecting steps take place, the probing retroreflector is periodically moved by hand or machine along the target surface, thereby moving the point in space relative to the target surface. That point in space has its distance from the reference position periodically measured by the tracking laser interferometer 14. By determining the positions of the series of points of contact of the sensor on the target surface, the actual contour of the surface can be determined.

Since the sensor 38 is relatively small and can come to a small point at the end, it can be used for very small surfaces or other targets and those that are complex to follow or difficult to engage. Advantageously, the radial offset between the outer surface of the sensor and its center point can be compensated for via software used in the control system 96 to maintain a high degree of accuracy.

Since the corner cube center point C represents the virtual location of the center of the sensor 38, a very accurate representation of the actual location of the sensor center is provided to the tracking laser interferometer 14.

Figure 7:
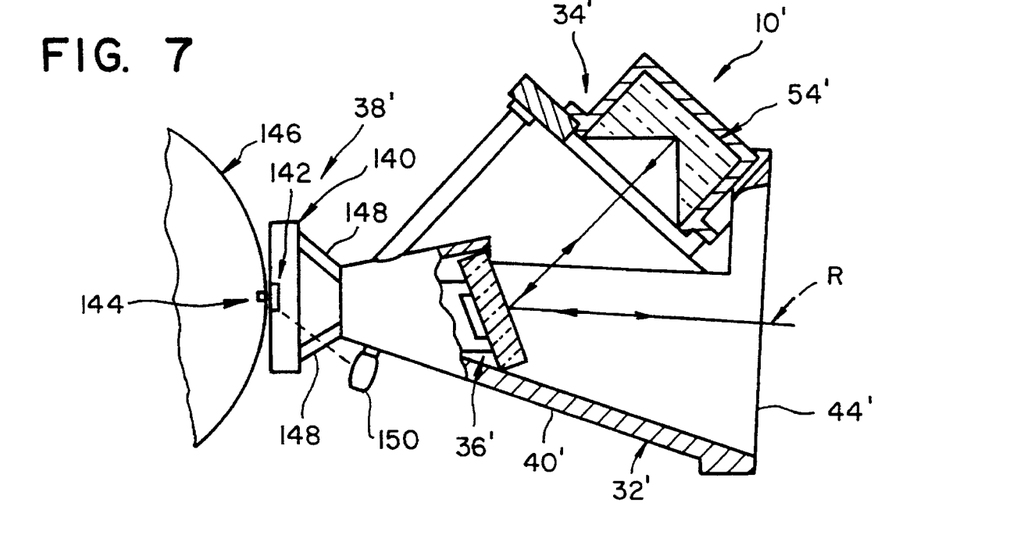
FIG. 7 is a side elevational diagrammatic view, not to scale, of a modified probing retroreflector in accordance with the invention in which the sensor comprises a glass slide and a reticle.
Figure 8:
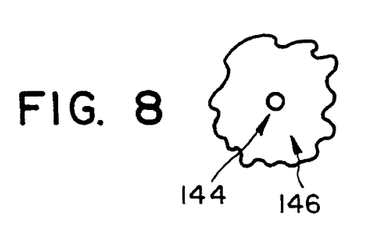
FIG. 8 is a front elevational view of the target shown in FIG. 7.
Figure 9:
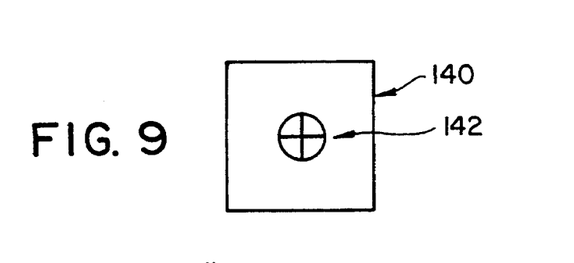
FIG. 9 is a rear elevational view of the glass slide and reticle shown in FIG. 7.

Embodiment of FIGS. 7–9

An alternative embodiment of the invention is shown in FIGS. 7–9 in which a modified retroreflector 10' uses as the sensor a transparent glass slide 140 rigidly coupled to the main body and carrying a reticle 142 thereon. The reticle 142 senses the location of the target 144 on the overall surface 146 by being physically aligned with the target. This type of "bomb sight" sensor is advantageously used to align the retroreflector 10' with very small targets.

Except for the addition of the slide 140, rigid supports 148 for the slide, and an optical magnifying lens 150 rigidly coupled to the main body, the remaining parts of the retroreflector 10' are the same as those described above regarding retroreflector 10, and like reference numerals are used in FIGS. 7–9 with the addition of a prime.

The reticle 142 as seen in FIG. 9 is a simple pair of perpendicular cross hairs enclosed in a circle, but it could be any other system of lines, dots, cross hairs, or wires in the focus of the lens 150.

In operation, the retroreflector 10' of FIGS. 7–9 is manipulated by the operator so that the glass slide 140 is placed on the surface 146 and is moved until the reticle 142 is aligned with the target 144. Such alignment can be obtained and viewed by the operator by looking through the magnifying lens 150 and observing the reticle 142 and the target 144. The retroreflector is then operated as necessary as discussed above regarding retroreflector 10 in FIGS. 1–6.

Figure 10:
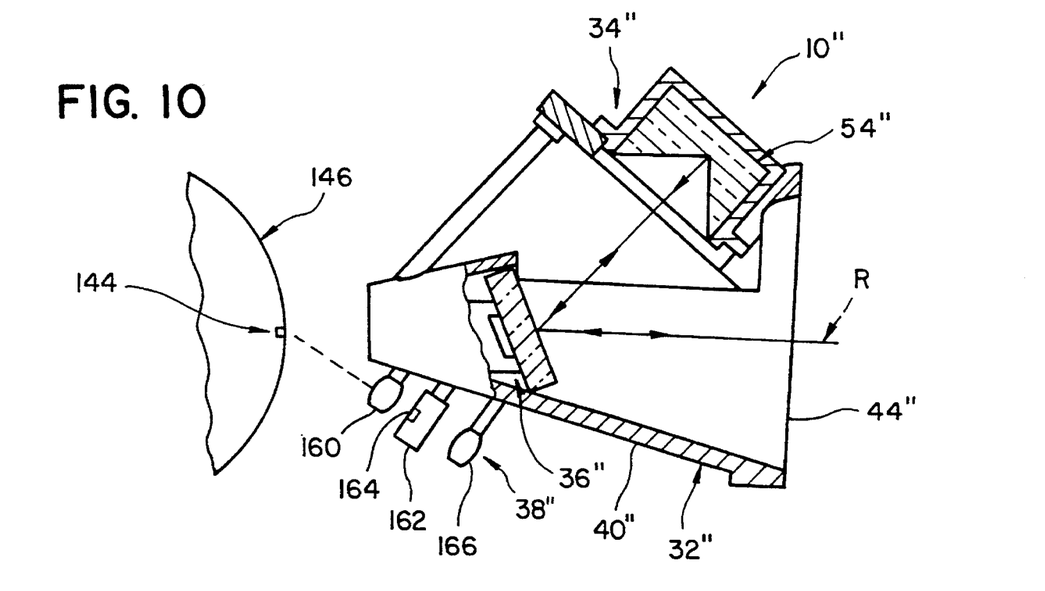
FIG. 10 is a side elevational diagrammatic view, not to scale, of a further modified probing retroreflector in accordance with the invention in which the sensor is of the non-contact type and comprises a series of lenses, a glass slide and a reticle.

Embodiment of FIG. 10

Another alternative embodiment of the invention is shown in FIG. 10 in which a modified retroreflector 10" uses another bomb sight target sensor for sensing the target without actually physically contacting the target. In this embodiment, the sensor comprises a focusing lens 160, a glass slide 162, a reticle 164 on the slide, and a magnifying lens 166, all rigidly coupled to the retroreflector 10" and optically aligned. Reticle 164 can be the same as reticle 142 shown in FIGS. 7–9. Reticle 164 is also advantageously used to sense the location of very small targets.

Except for the modified sensor, the remaining parts of the retroreflector 10" are the same as those described above regarding retroreflector 10, and like reference numerals are used in FIG. 10 with the addition of a double prime.

In operation, the retroreflector 10" of FIG. 10 is manipulated by the operator so that the sensor 38" comprising lens 160, slide 162, reticle 164 and lens 166 are aligned with the target 144 and the image of the target 144 is in focus with the reticle 164, as determined by the operator viewing through lens 166. The retroreflector is then operated as necessary as discussed above regarding retroreflector 10 in FIGS. 1–6.

While various advantageous embodiments have been chosen to illustrate the invention, it will be understood by those skilled in the art that various changes and modifications can be made therein without departing from the scope of the invention as defined in the appended claims.

For example, to measure hidden points on the back side of a relatively thin target, the main body can have a substantially U-shaped recess to receive the target therein. In such a configuration, the planar reflector and corner cube would be on one side of the U-shaped recess and the sensor would be on the other side.

In addition, when measuring horizontal surfaces with a mechanical sensor, the laser beam should be directed at the target surface at an angle of not smaller than about 10° and not greater than about 50° with a main body of minimum size. If a bomb sight visual sensor is used, this angle range can be about 5° to about 40°.

To aid in operation of the invention by one person, a remote push button or other switch control for the laser and tracker can be located on the retroreflector assembly and communicate with the tracker via wire, radio, infrared, or similar methods.

Moreover, in the embodiments shown in FIGS. 7–10, any additional desired illumination devices and beam splitters can be used to aid in viewing of the target and aiming of the retroreflector assembly.

What is claimed is:

1. A method of measuring the dimensions of a surface comprising the steps of directing a light beam generally towards the surface from a range measuring means, located at a reference position, for measuring dimensions of the surface, reflecting the light beam away from the surface and towards a point in space which represents the virtual location of a point on the surface, retroreflecting the light beam in the opposite direction and in a substantially parallel manner, reflecting the light beam generally away from the surface to the range measuring means, and periodically moving the point in space relative to the surface and determining the location of the point in space from the reference position using the reflected light beam and the range measuring means.

2. A method according to claim 1, wherein the light beam is a coherent light beam.

3. A method according to claim 1, wherein the light beam is a laser beam.

4. A method according to claim 1, wherein the directing step includes the steps of splitting the light beam into two parts, directing the first part of the light beam towards the target, and directing the second part of the light beam into the range measuring means, and the second reflecting step is followed by the step of directing the first part of the light beam into the range measuring means to determine the distance of the target from the reference position.

5. A method of measuring the dimensions of a surface using a laser interferometer comprising the steps of directing a light beam generally towards the surface from a source including the laser interferometer located at a reference position, reflecting the light beam away from the surface and towards a point in space which represents the virtual location of a point on the surface, retroreflecting the light beam in the opposite direction and in a substantially parallel manner, reflecting the light beam generally away from the surface and generally towards the reference position, and periodically moving the point in space relative to the surface and determining the location of the point in space from the reference position using the reflected light beam and the laser interferometer.

6. A method of determining the location of a target in space comprising the steps of directing a light beam generally towards the target from a ranging measuring means, located at a reference position, for measuring dimensions of the surface, reflecting the light beam away from the target and towards a point in space which represents the virtual location of a point on the target, retroreflecting the light beam in the opposite direction and in a substantially parallel manner, reflecting the light beam generally away from the target to the range measuring means, and determining the location of the point in space from the reference position using the reflected light beam and the range measuring means.

7. A method according to claim 6, wherein the light beam is a coherent light beam.

8. A method according to claim 6, wherein the light beam is a laser beam.

9. A method according to claim 6, wherein the directing step includes the steps of splitting the light beam into two parts, directing the first part of the light beam towards the target, and directing the second part of the light beam into the range measuring means, and the second reflecting step is followed by the step of directing the first part of the light beam into the range measuring means to determine the distance of the target from the reference position.

10. A method of determining the location of a target in space using a laser interferometer comprising the steps of directing a light beam generally towards the target from a source including the laser interferometer located at a reference position, reflecting the light beam away from the target and towards a point in space which represents the virtual location of a point on the target, retroreflecting the light beam in the opposite direction and in a substantially parallel manner, reflecting the light beam generally away from the target and generally towards the reference position, and determining the location of the point in space from the reference position using the reflected light beam and the laser interferometer.

11. A method of retroreflecting a light beam used to provide location information of a target in space, comprising the steps of directing the light beam generally towards the target from a range measuring means, located at a reference location, for providing location information of the target, reflecting the light beam away from the target and towards a a point in space which represents the virtual location of a point on the target, retroreflecting the light beam in the opposite direction and in a substantially parallel manner, reflecting the light beam generally away from the target to the range measuring means.

12. A method according to claim 11, and further comprising the step of determining at least one of the x, y and z coordinates of the point in space relative to the reference position using the light beam.

13. A method according to claim 11, wherein the directing step includes the step of splitting the light beam into two parts.

14. A method according to claim 13, wherein the splitting step includes the steps of directing the first part of the light beam towards the target and directing the second part of the light beam into the range measuring means.

15. A method according to claim 14, wherein the second reflecting step is followed by the step of directing the first part of the light beam into the range measuring means to determine the distance of the target from the reference position.

16. A retroreflector, the combination comprising:

a support having a central axis A;

retroreflector means, coupled to said support, for receiving a light beam and reflecting the beam in the form of an output beam parallel to the input beam, said retroreflector means having a central axis B and a center point C;

planar reflector means, coupled to said support, for reflecting a light beam from a range measuring means onto said retroreflector means and for reflecting a light beam from said retroreflector means towards the range measuring means, and sensor means, coupled to said support, for sensing the location of a target, said sensor means and said retroreflector means center point C being substantially equidistant from and on opposite sides of a plane D containing said planar reflector means;

said sensor means and said retroreflector center point C lying on a line E which is substantially perpendicular to said plane D;

said planar reflector means being oriented at an angle of greater than 0° and less than 180° to said retroreflector means central axis B.

17. A retroreflector according to claim 16, wherein said retroreflector means comprises a corner cube.

18. A retroreflector according to claim 16, wherein said planar reflector means comprises a front surface planar mirror.

19. A retroreflector according to claim 16, wherein said sensor means comprises a probe.

20. A retroreflector according to claim 16, wherein said sensor means comprises a probe having a substantially spherical distal end.

21. A retroreflector according to claim 16, wherein said retroreflector means comprises a corner cube, said planar reflector means comprises a front surface planar mirror, and said sensor means comprises a probe having a substantially spherical distal end.

22. A retroreflector according to claim 16, wherein said planar retroreflector means is oriented at an angle of about 60° to said retroreflector means central axis B.

23. A retroreflector according to claim 16, wherein said sensor means comprises a reticle.

24. A retroreflector according to claim 16, wherein said sensor means comprises means for optically aligning the target with said support.

* * * * *